United States Patent
Wu

(10) Patent No.: US 10,004,009 B2
(45) Date of Patent: Jun. 19, 2018

(54) DEVICE AND METHOD OF HANDLING A HANDOVER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days. days.

(21) Appl. No.: 15/610,639

(22) Filed: Jun. 1, 2017

(65) Prior Publication Data

US 2017/0353895 A1    Dec. 7, 2017

Related U.S. Application Data

(60) Provisional application No. 62/345,009, filed on Jun. 3, 2016.

(51) Int. Cl.
| *H04W 36/00* | (2009.01) |
| *H04W 36/26* | (2009.01) |
| *H04W 74/08* | (2009.01) |

(52) U.S. Cl.
CPC ... *H04W 36/0061* (2013.01); *H04W 36/0077* (2013.01); *H04W 36/0094* (2013.01); *H04W 36/0005* (2013.01); *H04W 36/26* (2013.01); *H04W 74/0833* (2013.01)

(58) Field of Classification Search
CPC .. H04W 36/08; H04W 36/0061; H04W 36/00
See application file for complete search history.

(56) References Cited

U.S. PATENT DOCUMENTS

| 2007/0293224 A1 | 12/2007 | Wang |
| 2010/0142485 A1 | 6/2010 | Lee |

(Continued)

FOREIGN PATENT DOCUMENTS

| WO | 2015036017 A1 | 3/2015 | |
| WO | 2016031779 A1 | 3/2016 | |
| WO | WO/2016/031779 | * 3/2016 | ............ H04W 36/08 |

OTHER PUBLICATIONS

3GPP Draft R2-164225, LG Electronics, Nanjing, China, May 23-27, 2016.*

(Continued)

*Primary Examiner* — Myron K Wyche
(74) *Attorney, Agent, or Firm* — Winston Hsu

(57) ABSTRACT

A communication device for handling a handover comprises a storage device for storing instructions and a processing circuit coupled to the storage device. The processing circuit is configured to execute the instructions stored in the storage device. The instructions comprise receiving a handover command via a radio resource control (RRC) connection on a first cell from a first base station (BS); synchronizing to a downlink (DL) of a second cell indicated in the handover command; transmitting a handover complete message to the second cell in response to the handover command without performing a random access (RA) procedure to the second cell, if the handover command indicates no need to perform the RA procedure to the second cell; and determining that the handover is successful, when detecting a Radio Network Temporary Identifier (RNTI) on a DL channel from the second cell in a first time period.

14 Claims, 6 Drawing Sheets

(56) References Cited

U.S. PATENT DOCUMENTS

2010/0323709 A1    12/2010  Nam
2015/0043472 A1*  2/2015  Seo ...................... H04W 36/08
                                                                  370/329

OTHER PUBLICATIONS

Search Report dated Aug. 17, 2017 for EP application No. 17173950.1, pp. 1-23.
LG Electronics Inc., "Considerations on solution 2 for mobility enhancements", 3GPP TSG-RAN WG2 #94, R2-164225, May 23-27, 2016, Nanjing, China, XP051105507, pp. 1-2.
Huawei, HiSilicon, "RACH-less Handover for Mobility Enhancement", 3GPP TSG-RAN WG2 Meeting #93bis, R2-162410, Apr. 11-15, 2016, Dubrovnik, Croatia, XP051082401, pp. 1-3.
3GPP TS 36.331 V13.1.0 (Mar. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 13).
3GPP TS 36.133 V13.3.0 (Mar. 2016) Technical Specification 3rd Generation Partnership Project; Technical Specification Group Radio Access Network; Evolved Universal Terrestrial Radio Access (E-UTRA); Requirements for support of radio resource management (Release 13), pp. 48-363.
Office action dated Jan. 19, 2018 for the Taiwan application No. 106118212, filing date Jun. 2, 2017, p. 1-13.

\* cited by examiner

DEVICE AND METHOD OF HANDLING A HANDOVER

CROSS REFERENCE TO RELATED APPLICATIONS

This application claims the benefit of U.S. Provisional Application No. 62/345,009 filed on Jun. 3, 2016, which is incorporated herein by reference.

BACKGROUND OF THE INVENTION

1. Field of the Invention

The present invention relates to a device and a method used in a wireless communication system, and more particularly, to a device and a method of handling a handover.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. The core network may include mobility management and Quality of Service (QoS) control for the UE.

SUMMARY OF THE INVENTION

The present invention therefore provides a communication device and method for handling a handover to solve the abovementioned problem.

A communication device for handling a handover comprises a storage device for storing instructions and a processing circuit coupled to the storage device. The processing circuit is configured to execute the instructions stored in the storage device. The instructions comprise being configured a radio resource control (RRC) connection and a data radio bearer (DRB) with a first cell by a first base station (BS); receiving a handover command via the RRC connection on the first cell from the first BS, wherein the handover command indicates the communication device to perform a handover to a second cell; synchronizing to a downlink (DL) of the second cell indicated in the handover command; transmitting a handover complete message to the second cell in response to the handover command without performing a random access (RA) procedure to the second cell, if the handover command indicates no need to perform the RA procedure to the second cell; and determining that the handover is successful, when detecting a Radio Network Temporary Identifier (RNTI) on a DL channel from the second cell in a first time period.

A communication device for handling a handover comprises a storage device for storing instructions and a processing circuit coupled to the storage device. The processing circuit is configured to execute the instructions stored in the storage device. The instructions comprise being configured a radio resource control (RRC) connection and a data radio bearer (DRB) with a first cell by a first base station (BS); receiving a handover command via the RRC connection on the first cell from the first BS, wherein the handover command indicates the communication device to perform a handover to a second cell; synchronizing to a downlink (DL) of the second cell indicated in the handover command; transmitting a handover complete message to the second cell in response to the handover command without performing a random access (RA) procedure to the second cell, if the handover command indicates no need to perform the RA procedure to the second cell; and determining that the handover is successful, when receiving an acknowledgement for the handover complete message from the second cell in a first time period.

A communication device for handling a handover comprises a storage device for storing instructions and a processing circuit coupled to the storage device. The processing circuit is configured to execute the instructions stored in the storage device. The instructions comprise being configured a radio resource control (RRC) connection and a data radio bearer (DRB) with a first cell by a first base station (BS); receiving a handover command via the RRC connection on the first cell from the first BS, wherein the handover command indicates the communication device to perform a handover to a second cell; synchronizing to a downlink (DL) of the second cell indicated in the handover command; and determining that the handover is successful and transmitting a handover complete to the second cell, in response to the handover command without performing a random access (RA) procedure to the second cell, if the handover command indicates no need to perform the RA procedure to the second cell and the synchronization to the DL of the second cell is completed in a first time period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
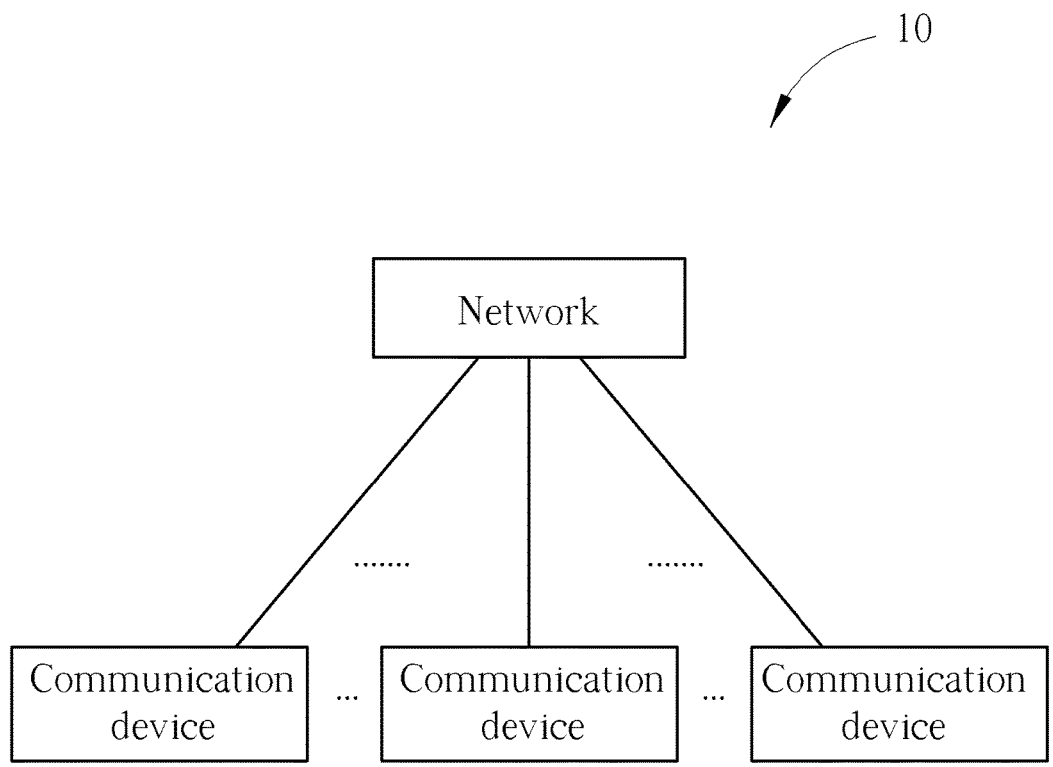
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device communicate with each other via one or more cells on one or more carriers of licensed band(s) and/or unlicensed band(s). The one or more cells may be operated in the same or different frame structure types, or in the same or different duplexing modes, i.e. frequency-division duplexing (FDD) and time-division duplexing (TDD).

In FIG. 1, the network and the communication devices are simply utilized for illustrating the structure of the wireless communication system 10. The network may include a radio access network (RAN) including at least one base station (BS). Practically, the RAN may be an evolved universal terrestrial radio access network (E-UTRAN) including at least one evolved Node-B (eNB). The RAN may be a fifth generation (5G) network including at least one 5G BS (e.g., gNB) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS. Furthermore, the network may also include a core network which includes network entities connecting to the RAN.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
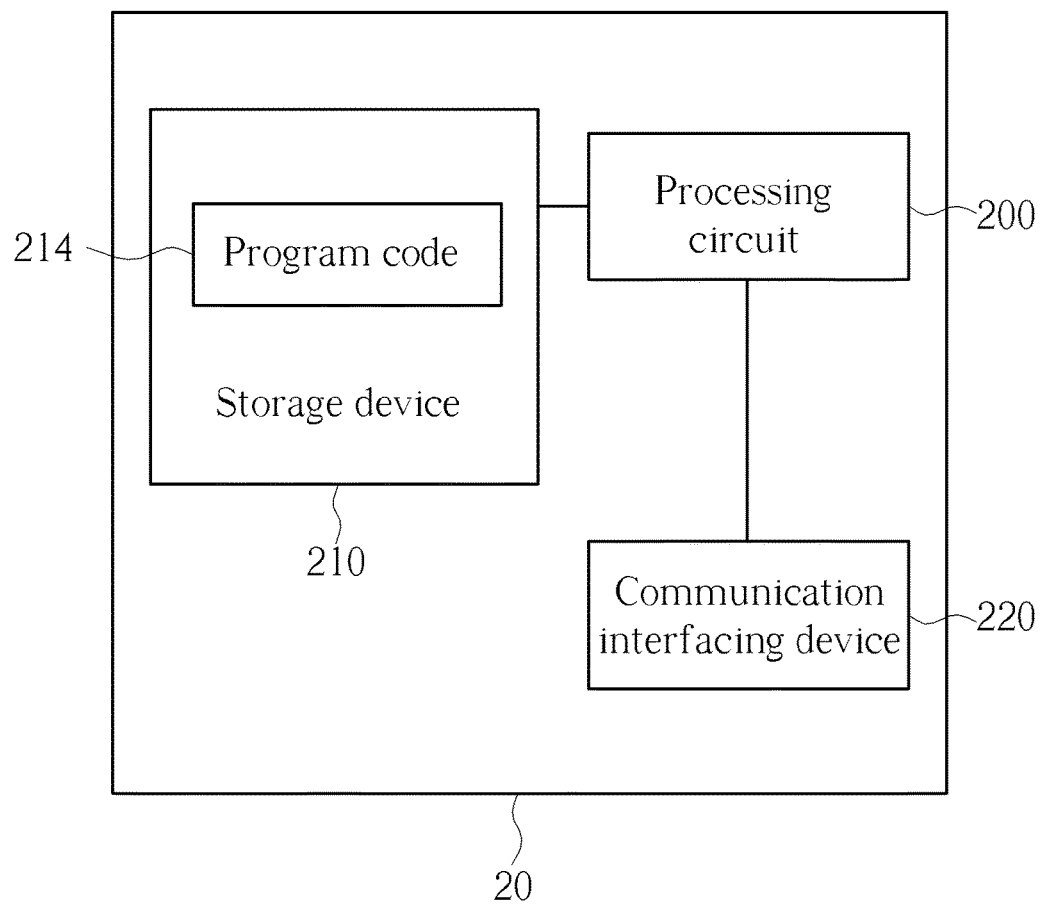
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
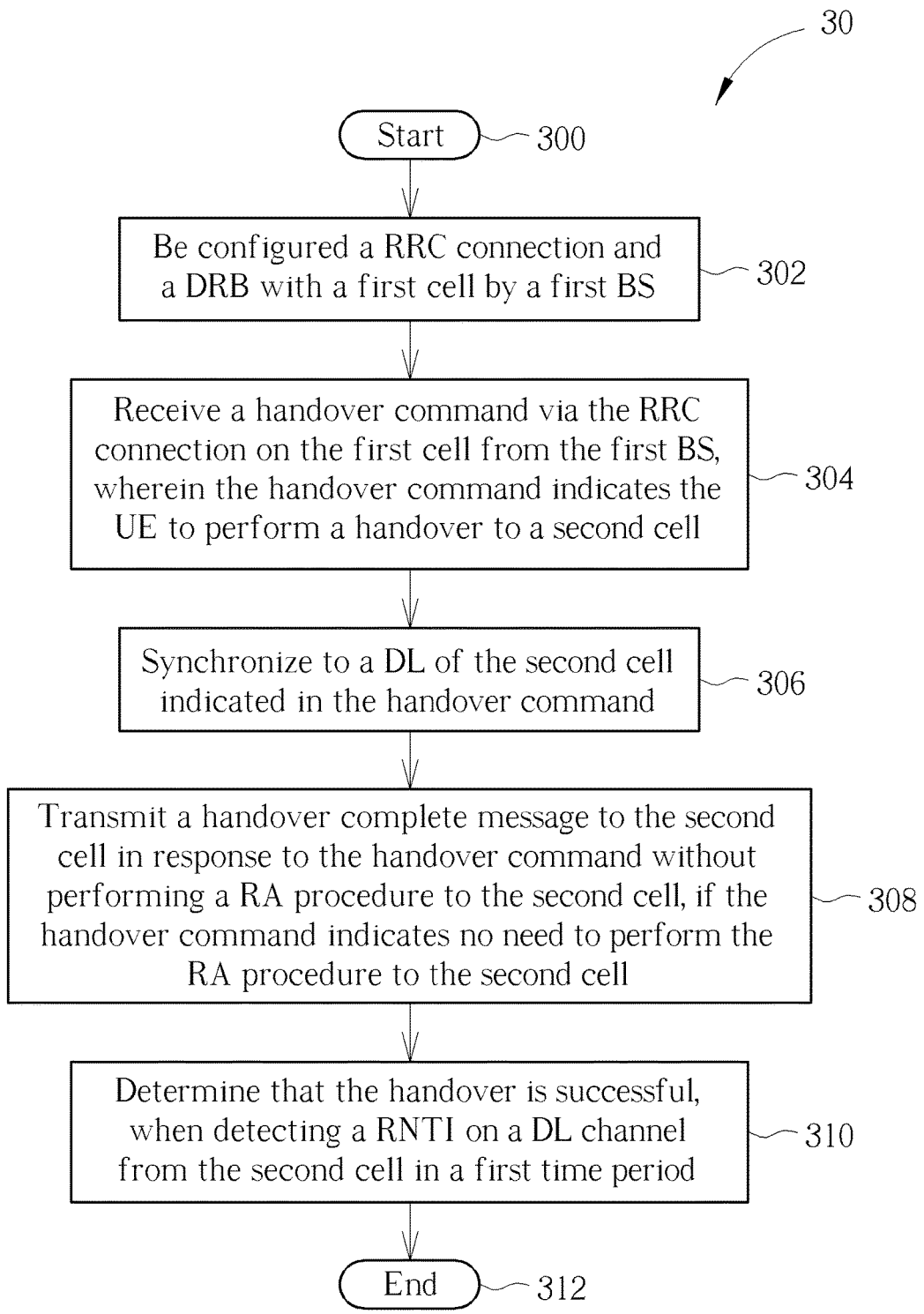
FIG. 3 is a flowchart of a process according to an example of the present invention.

FIG. 3 is a flowchart of a process 30 according to an example of the present invention. The process 30 is utilized in a UE (e.g., a communication device in FIG. 1), to handle a handover. The process 30 includes the following steps:

Step 300: Start.

Step 302: Be configured a radio resource control (RRC) connection and a data radio bearer (DRB) with a first cell by a first BS.

Step 304: Receive a handover command via the RRC connection on the first cell from the first BS, wherein the handover command indicates the UE to perform a handover to a second cell.

Step 306: Synchronize to a DL of the second cell indicated in the handover command.

Step 308: Transmit a handover complete message to the second cell in response to the handover command without performing a random access (RA) procedure to the second cell, if the handover command indicates no need to perform the RA procedure to the second cell.

Step 310: Determine that the handover is successful, when detecting a Radio Network Temporary Identifier (RNTI) on a DL channel from the second cell in a first time period.

Step 312: End.

According to the process 30, the UE is configured a RRC connection and a DRB with a first cell by a first BS (e.g., of the network in FIG. 1). The UE receives a handover command via the RRC connection on the first cell from the first BS, wherein the handover command indicates (e.g., orders, instructs) the UE to perform a handover to a second cell. Accordingly, the UE synchronizes to a DL of the second cell indicated in the handover command. The UE transmits a handover complete message to the second cell in response to the handover command without performing a RA procedure to the second cell, if the handover command indicates (e.g., orders, instructs) no need to perform the RA procedure to the second cell. The UE determines that the handover is successful, when detecting a RNTI on a DL channel from the second cell in a first time period. That is, whether the handover is successful is determined according to whether the RNTI is detected.

Realization of the process 30 is not limited to the above description. The following examples may be applied to the process 30.

In one example, the UE starts a first timer (e.g., T304) for determining whether the first time period is exceeded, when receiving the handover command. The UE stops the first timer, when detecting the RNTI on the DL channel from the second cell before the first timer expires. That is, the UE uses the first timer for counting the first time period.

In one example, the UE determines that the handover is failed, when the UE does not detect the RNTI from the second cell in the first time period. For example, the UE determines that the handover is failed, when the first timer expires.

In one example, the UE detects the RNTI on the DL channel by detecting a resource allocation (e.g., DL control information (DCI)) with a cyclic redundancy check (CRC) scrambled by the RNTI on the DL channel. Further, the resource allocation may include an uplink (UL) grant or a DL assignment.

In one example, the DL channel is a physical DL control channel (PDCCH) or an enhanced PDCCH (E-PDCCH). In one example, the RNTI is a cell RNTI (C-RNTI) of the UE or a system information RNTI (SI-RNTI). The C-RNTI may be included in the handover command.

Figure 4:
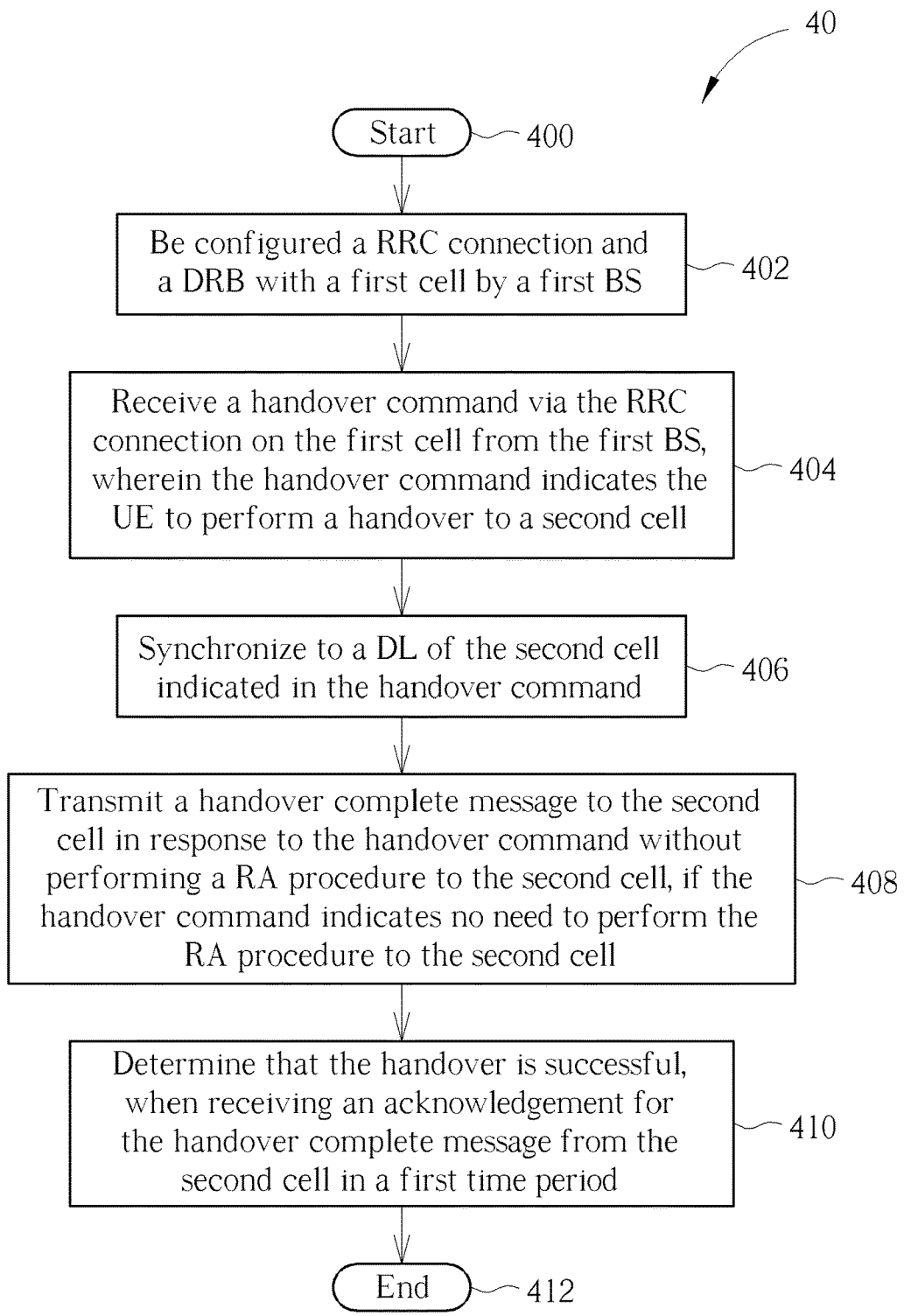
FIG. 4 is a flowchart of a process according to an example of the present invention.

FIG. 4 is a flowchart of a process 40 according to an example of the present invention. The process 40 is utilized in a UE (e.g., a communication device in FIG. 1), to handle a handover. The process 40 includes the following steps:

Step 400: Start.

Step 402: Be configured a RRC connection and a DRB with a first cell by a first BS.

Step 404: Receive a handover command via the RRC connection on the first cell from the first BS, wherein the handover command indicates the UE to perform a handover to a second cell.

Step 406: Synchronize to a DL of the second cell indicated in the handover command.

Step 408: Transmit a handover complete message to the second cell in response to the handover command without performing a RA procedure to the second cell, if the handover command indicates no need to perform the RA procedure to the second cell.

Step 410: Determine that the handover is successful, when receiving an acknowledgement for the handover complete message from the second cell in a first time period.

Step 412: End.

According to the process 40, the UE is configured a RRC connection and a DRB with a first cell by a first BS (e.g., of the network in FIG. 1). The UE receives a handover command via the RRC connection on the first cell from the first BS, wherein the handover command indicates (e.g., orders, instructs) the UE to perform a handover to a second cell. Accordingly, the UE synchronizes to a DL of the second cell indicated in the handover command. The UE transmits a handover complete message to the second cell in response to the handover command without performing a RA procedure to the second cell, if the handover command indicates (e.g., orders, instructs) no need to perform the RA procedure to the second cell. The UE determines that the handover is successful, when receiving an acknowledgement for the handover complete message from the second cell in a first time period. That is, whether the handover is successful is determined according to whether the acknowledgement is received.

Realization of the process 40 is not limited to the above description. The following examples may be applied to the process 40.

In one example, the acknowledgement may be a Medium Access Control (MAC) protocol data unit (PDU), a radio link control (RLC) acknowledgement, a hybrid automatic repeat request (HARQ) acknowledgement or a RRC message.

In one example, the UE starts a first timer (e.g., T304) for determining whether the first time period is exceeded, when receiving the handover command. The UE stops the first timer, when receiving the acknowledgement before the first timer expires. That is, the UE uses the first timer for counting the first time period.

In one example, the UE determines that the handover is failed, when the UE does not receive the acknowledgement from the second cell in the first time period. For example, the UE determines that the handover is failed, when the first timer expires.

Figure 5:
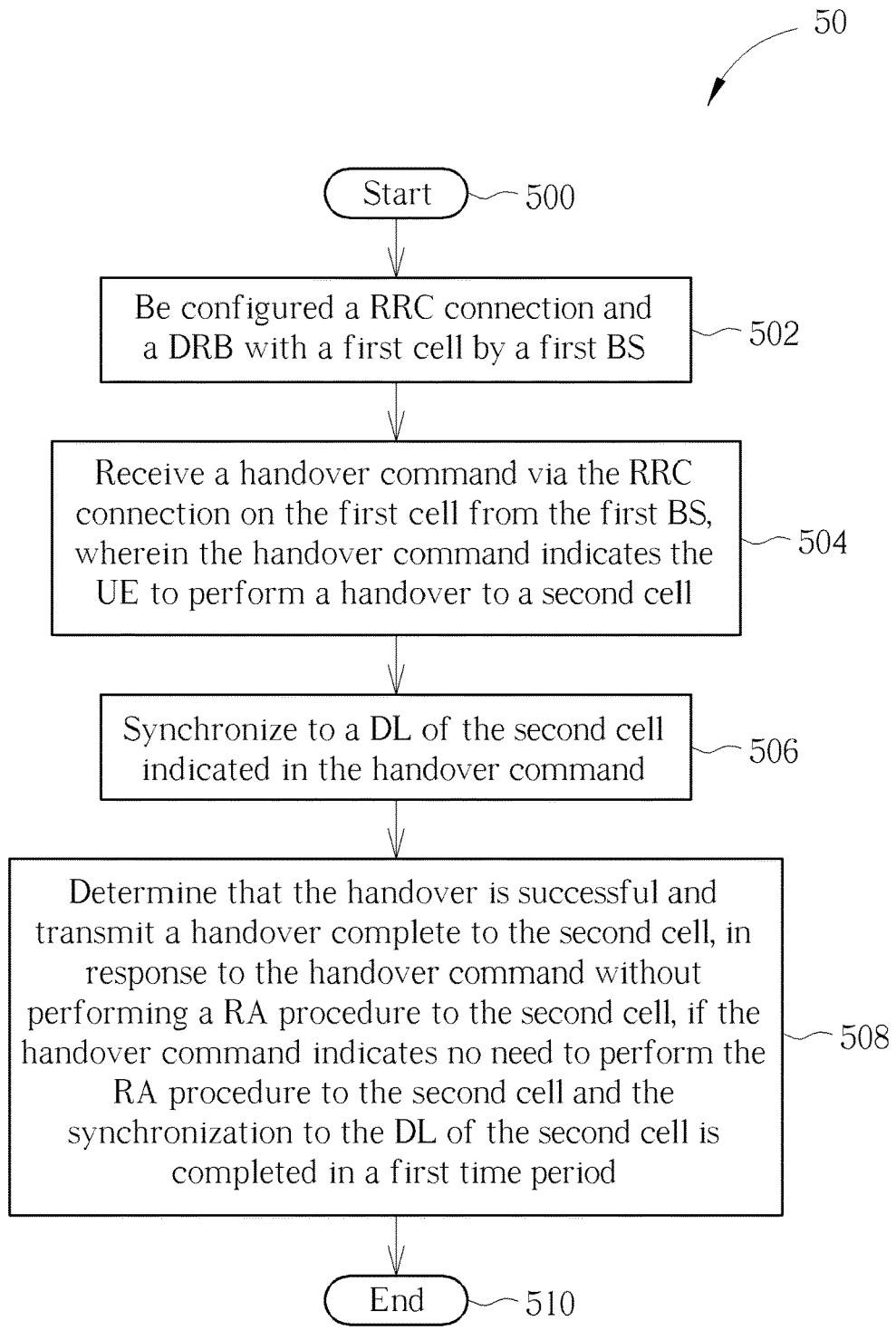
FIG. 5 is a flowchart of a process according to an example of the present invention.

FIG. 5 is a flowchart of a process 50 according to an example of the present invention. The process 50 is utilized in a UE (e.g., a communication device in FIG. 1), to handle a handover. The process 50 includes the following steps:

Step 500: Start.

Step 502: Be configured a RRC connection and a DRB with a first cell by a first BS.

Step 504: Receive a handover command via the RRC connection on the first cell from the first BS, wherein the handover command indicates the UE to perform a handover to a second cell.

Step 506: Synchronize to a DL of the second cell indicated in the handover command.

Step 508: Determine that the handover is successful and transmit a handover complete to the second cell, in response to the handover command without performing a RA procedure to the second cell, if the handover command indicates no need to perform the RA procedure to the second cell and the synchronization to the DL of the second cell is completed in a first time period.

Step 510: End.

According to the process 50, the UE is configured a RRC connection and a DRB with a first cell by a first BS (e.g., of the network in FIG. 1). The UE receives a handover command via the RRC connection on the first cell from the first BS, wherein the handover command indicates (e.g., orders, instructs) the UE to perform a handover to a second cell. Accordingly, the UE synchronizes to a DL of the second cell indicated in the handover command. The UE determines that the handover is successful and transmit a handover complete to the second cell, in response to the handover command without performing a RA procedure to the second cell, if the handover command indicates no need to perform the RA procedure to the second cell and the synchronization to the DL of the second cell is completed in a first time period. That is, whether the handover is successful is determined according to whether the synchronization to the DL of the second cell is completed in the first time period.

Realization of the process 50 is not limited to the above description. The following examples may be applied to the process 50.

In one example, the UE starts a first timer (e.g., T304) for determining whether the first time period is exceeded, when receiving the handover command. The UE stops the first timer, when the synchronization to the DL of the second cell is completed before the first timer expires. That is, the UE uses the first timer for counting the first time period.

In one example, the UE determines that the handover is failed, when the synchronization to the DL of the second cell is not completed in the first time period. For example, the UE determines that the handover is failed, when the first timer expires.

Figure 6:
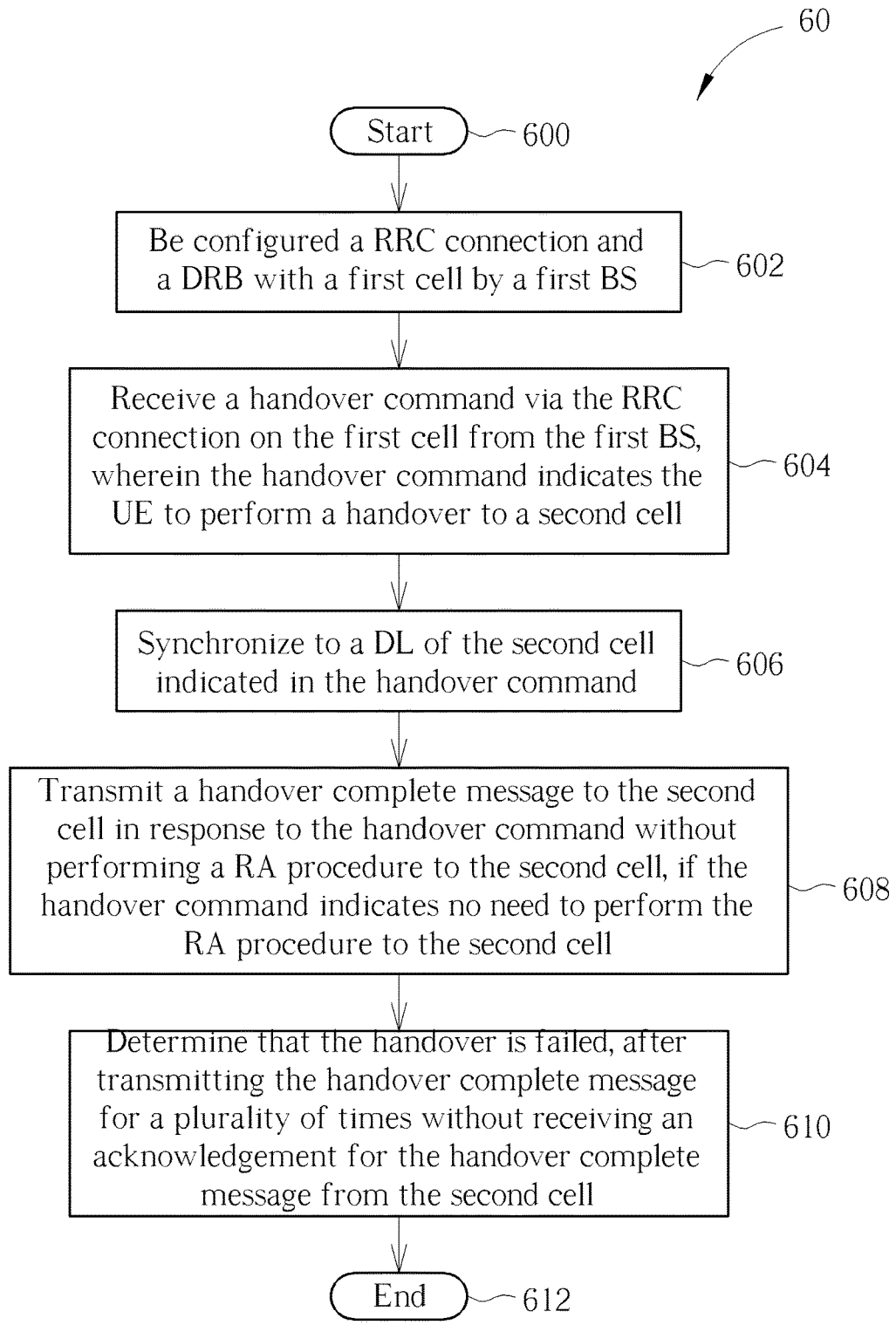
FIG. 6 is a flowchart of a process according to an example of the present invention.

FIG. 6 is a flowchart of a process 60 according to an example of the present invention. The process 60 is utilized in a UE (e.g., a communication device in FIG. 1), to handle a handover. The process 60 includes the following steps:

Step 600: Start.

Step 602: Be configured a RRC connection and a DRB with a first cell by a first BS.

Step 604: Receive a handover command via the RRC connection on the first cell from the first BS, wherein the handover command indicates the UE to perform a handover to a second cell.

Step 606: Synchronize to a DL of the second cell indicated in the handover command.

Step 608: Transmit a handover complete message to the second cell in response to the handover command without performing a RA procedure to the second cell, if the handover command indicates no need to perform the RA procedure to the second cell.

Step 610: Determine that the handover is failed, after transmitting the handover complete message for a plurality of times without receiving an acknowledgement for the handover complete message from the second cell.

Step 612: End.

According to the process 60, the UE is configured a RRC connection and a DRB with a first cell by a first BS (e.g., of the network in FIG. 1). The UE receives a handover command via the RRC connection on the first cell from the first BS, wherein the handover command indicates (e.g., orders, instructs) the UE to perform a handover to a second cell. Accordingly, the UE synchronizes to a DL of the second cell indicated in the handover command. The UE transmits a handover complete message to the second cell in response to the handover command without performing a RA procedure to the second cell, if the handover command indicates (e.g., orders, instructs) no need to perform the RA procedure to the second cell. The UE determines that the handover is failed (i.e., handover failure), after transmitting the handover complete message for a plurality of times without receiving an acknowledgement for the handover complete message from the second cell. That is, whether the handover is failed is determined according to the number of transmitted handover complete messages that are not acknowledged.

Realization of the process 60 is not limited to the above description. The following examples may be applied to the process 60.

In one example, the UE includes the handover complete message in a PDU, and transmits the PDU for a specific number of times. The PDU may be a MAC PDU, a RLC PDU or a packet data convergence protocol (PDCP) PDU. In one example, the specific number is included in the handover command.

The following examples may be applied to any of the processes 30-60.

In one example, when/after determining that the handover is successful, the UE considers an out-of-sync indication for the second cell as valid. That is, the UE does not consider the out-of-sync indication as valid within the first time period to avoid that the UE determines that a radio link failure occurs before completing the handover.

In one example, the second cell belongs to the first BS or a second BS. The first BS may be an LTE eNB or a 5G BS. The second BS may be an LTE eNB or a 5G BS.

In one example, the UE synchronizing to the DL of the second cell configured in the handover command includes synchronizing to at least one synchronization signal (e.g., primary synchronization signal (PSS), secondary synchronization signal (SSS), reference signal (RS)). The RS may be a channel state information RS, a cell-specific RS or a discovery RS.

In one example, the handover command may include a RA configuration. The RA configuration may include at least one of a common RA channel (RACH) configuration (e.g., RACH-ConfigCommon), a dedicated RACH configuration (e.g., RACH-ConfigDedicated) and a physical RA channel (PRACH) configuration (e.g., PRACH-Config). The handover command may include an indication indicating no need to perform the RA procedure in the handover. That is, the RA procedure is not required for the handover, and the UE does not perform the RA procedure according to the RA configuration. In another example, the handover command does not include any RA configuration. According to the examples above, the UE knows that the first BS configures it to not performing the RA procedure.

In one example, the UE performs the RA procedure to the second cell, when not receiving the acknowledgement for the handover complete message from the second cell within a second time period or when not detecting a cell RNTI (C-RNTI) of the UE on a DL channel from the second cell within the second time period. The second time period may be shorter than the first time period. In one example, the UE may start a second timer for counting the second time period. When/after the second timer expires, the UE performs the RA procedure.

In one example, the UE transmits a scheduling request (SR) to the second cell, when not receiving the acknowledgement for the handover complete message from the second cell within a second time period or when not detecting a C-RNTI of the UE on a DL channel from the second cell within the second time period. The second time period may be shorter than the first time period. In one example, the UE may start a second timer for counting the second time period. When/after the second timer expires, the UE transmits the SR.

In one example, the UE performs the RA procedure to the second cell, if/when the handover command indicates that the RA procedure is required. For example, the handover command includes the RA configuration, and does not include the indication indicating no need to perform the RA procedure in the handover. The UE successfully performs the handover and stops the first timer (and/or the second timer) when successfully completing the RA procedure. When the UE does not successfully complete the RA procedure and the first timer expires, the UE determines the handover is failed.

In one example, when the handover is failed, the UE initiates a RRC connection reestablishment procedure. In the RRC connection reestablishment procedure, the UE may transmit a RRCConnectionReestablishmentRequest message to a cell (e.g., the first cell, the second cell or a third cell) to recover the handover failure. When the UE receives a RRCConnectionReestablishment message in response to the RRCConnectionReestablishmentRequest message, the handover failure is recovered.

In one example, after the UE successfully performs the handover, the UE apply parts of a channel quality indicator (CQI) reporting configuration, a SR configuration and a sounding RS (RS) configuration that do not require the UE to know a single-frequency network (SFN) of the second cell, if any.

In one example, after the UE successfully performs the handover, the UE applies part of a measurement configuration and a radio resource configuration that require the UE to know the SFN of the second cell (e.g., measurement gap, periodic CQI reporting, SR configuration, SRS configuration), if any, when acquiring the SFN of the second cell.

In one example, the handover command may include a timing advance (TA) value for the UE to adjust a UL transmission timing of the second cell besides indicating no need to perform the RA procedure. In another example, the TA value may be included in a MAC control element in a MAC PDU transmitted to the UE by the first BS. The MAC PDU may include the handover command. The UE uses the TA value to adjust the UL transmission timing for transmitting the handover complete message.

In one example, the first BS does not transmit the TA value. The UE may use a TA value received from the first cell before the handover to adjust the UL transmission timing for transmitting the handover complete message, or the UE may adjust the UL transmission timing for the second cell according to the UL transmission timing for the first cell and a DL timing of the second cell.

In one example, the handover command includes a UL resource configuration including UL time/frequency resource(s) (e.g., subframe(s), subcarrier(s), and/or resource block(s)). The UE transmits the handover complete message according to (e.g., using) the UL resource configuration. In one example, the UE transmits data of the DRB together with the handover complete message in a MAC PDU via the UL time/frequency resource(s).

In one example, the RRC connection includes a signaling radio bearer (SRB). In one example, the handover command is a first RRC message (e.g., RRCConnectionReconfiguration), and the handover complete message is a second RRC message (e.g., RRCConnectionReconfigurationComplete).

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a handover. A communication device can synchronize to a cell of a target BS, when a RA procedure is not performed for the handover.

Thus, communications between the communication device and the target BS can proceed regularly after performing the handover.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a handover, comprising:
a storage device, for storing instructions of:
being configured a radio resource control (RRC) connection and a data radio bearer (DRB) with a first cell by a first base station (BS);
receiving a handover command via the RRC connection on the first cell from the first BS, wherein the handover command indicates the communication device to perform a handover to a second cell;
synchronizing to a downlink (DL) of the second cell indicated in the handover command;
transmitting a handover complete message to the second cell in response to the handover command without performing a random access (RA) procedure to the second cell, if the handover command indicates no need to perform the RA procedure to the second cell; and
determining that the handover is successful, when detecting a Radio Network Temporary Identifier (RNTI) on a DL channel from the second cell in a first time period; and
a processing circuit, coupled to the storage device, configured to execute the instructions stored in the storage device.

2. The communication device of claim 1, wherein the storage device further stores the instructions of:
starting a first timer for determining whether the first time period is exceeded, when receiving the handover command; and
stopping the first timer, when detecting the RNTI on the DL channel from the second cell before the first timer expires.

3. The communication device of claim 1, wherein the storage device further stores the instruction of:
determining that the handover is failed, when the communication device does not detect the RNTI from the second cell in the first time period.

4. The communication device of claim 1, wherein the communication device detects the RNTI on the DL channel by detecting a resource allocation with a cyclic redundancy check (CRC) scrambled by the RNTI on the DL channel, and the resource allocation comprises an uplink (UL) grant or a DL assignment.

5. The communication device of claim 1, wherein the RNTI is a cell RNTI (C-RNTI) of the communication device or a system information RNTI (SI-RNTI).

6. The communication device of claim 1, wherein the storage device further stores the instruction of:
performing the RA procedure to the second cell, if the handover command indicates that the RA procedure is required.

7. The communication device of claim 1, wherein the handover command comprises a RA configuration and an indication indicating no need to perform the RA procedure in the handover.

8. A communication device for handling a handover, comprising:
a storage device, for storing instructions of:
being configured a radio resource control (RRC) connection and a data radio bearer (DRB) with a first cell by a first base station (BS);
receiving a handover command via the RRC connection on the first cell from the first BS, wherein the handover command indicates the communication device to perform a handover to a second cell;
synchronizing to a downlink (DL) of the second cell indicated in the handover command;
transmitting a handover complete message to the second cell in response to the handover command without performing a random access (RA) procedure to the second cell, if the handover command indicates no need to perform the RA procedure to the second cell; and
determining that the handover is successful, when receiving an acknowledgement for the handover complete message from the second cell in a first time period; and
a processing circuit, coupled to the storage device, configured to execute the instructions stored in the storage device.

9. The communication device of claim 8, wherein the storage device further stores the instructions of:
starting a first timer for determining whether the first time period is exceeded, when receiving the handover command; and
stopping the first timer, when receiving the acknowledgement before the first timer expires.

10. The communication device of claim 8, wherein the storage device further stores the instruction of:
determining that the handover is failed, when the communication device does not receive the acknowledgement from the second cell in the first time period.

11. The communication device of claim 8, wherein the storage device further stores the instruction of:
performing the RA procedure to the second cell, if the handover command indicates that the RA procedure is required.

12. The communication device of claim 8, wherein the handover command comprises a RA configuration and an indication indicating no need to perform the RA procedure in the handover.

13. A communication device for handling a handover, comprising:
a storage device, for storing instructions of:
being configured a radio resource control (RRC) connection and a data radio bearer (DRB) with a first cell by a first base station (BS);
receiving a handover command via the RRC connection on the first cell from the first BS, wherein the handover command indicates the communication device to perform a handover to a second cell;
synchronizing to a downlink (DL) of the second cell indicated in the handover command;
determining that the handover is successful and transmitting a handover complete to the second cell, in response to the handover command without performing a random access (RA) procedure to the second cell, if the handover command indicates no need to perform the RA procedure to the second cell and the synchronization to the DL of the second cell is completed in a first time period;

starting a first timer for determining whether the first time period is exceeded, when receiving the handover command; and stopping the first timer, when the synchronization to the DL of the second cell is completed before the first timer expires; and a processing circuit, coupled to the storage device, configured to execute the instructions stored in the storage device.

14. The communication device of claim 13, wherein the storage device further stores the instruction of:

determining that the handover is failed, when the synchronization to the DL of the second cell is not completed in the first time period.

* * * * *